Sept. 29, 1959 F. A. FLANNERY ET AL 2,906,146
FLOATING REAMER
Filed Dec. 20, 1956

INVENTORS
FRANK A. FLANNERY &
RAYMOND E. NOVKOV
BY J. William Freeman
ATTORNEY

United States Patent Office 2,906,146
Patented Sept. 29, 1959

2,906,146

FLOATING REAMER

Frank A. Flannery and Raymond E. Novkov, Akron, Ohio; said Novkov assignor to Leonard W. Kuttler, Jr., Cuyahoga Falls, Ohio Application December 20, 1956, Serial No. 629,641

11 Claims. (Cl. 77—75)

This invention relates to reaming tools, and in particular has reference to an improved type of reaming tool that is floatingly suspended about the axis of rotation of the boring bar that carries the same.

In the art of reaming, it has long been known that a cutting bit can be disposed normally of the axis of rotation of a boring bar so that the cutting edge of the cutting bit will revolve in a circular arc upon rotation of the boring bar.

In this type of machining operation, the cutting bit has the cutting edge thereof normally set at an adjustable distance from the axis of rotation of the boring bar with the result that the diameter of the hole being bored is controlled as a result of the distance the cutting edge is spaced from the axis of rotation of the boring bar.

It has been proposed in the past to make double ended types of reaming tools with a double ended cutting bit being transversely positioned with respect to the axis of rotation of a boring bar. In this manner, a double cut is effectuated upon each revolution of the boring bar.

In the prior art, there have been contemplated certain improvements wherein adjustment features are incorporated for varying the location of one or more cutting bits with respect to the axis of rotation of the boring bar. However, without exception, all of these adjustment features have related to devices incorporated interiorly of the boring bar per se, with the result that a setting, or changing, of the location of the cutting edges can be effectuated only upon removal of the reaming tool with respect to the boring bar and then resetting the same so as to increase or decrease the distance between the cutting edges thereof.

It also follows that these cutting edges of the cutting bits of a double ended reaming tool must be equidistant from the axis of rotation of the boring bar. In this regard, difficulty has been encountered due to the fact that the locating of the cutting bit with respect to the axis of rotation of the boring bar is at best a cut-and-try method, with the result that inaccuracy will frequently occur as a result of one cutting bit being located a greater distance from the axis of rotation than the other. The effect of such mislocation is that the entire work of reaming is placed upon one tool due to the fact that the same, being located further from the axis of rotation, is the tool that actually does the cutting, while the remaining bit that is oppositely disposed therefrom, will perform little or no cutting because of the fact that the same will be out of contact with the surface due to the shorter distance that the same is displaced with respect to the axis of rotation of the boring bar.

It has been found that the aforementioned locating difficulties can be obviated by floatingly suspending a reaming tool with respect to the boring bar so that the cutting edges of the opposed cutting bits can automatically adjust themselves during operation so as to be equidistant from the axis of rotation of the boring bar.

It has been further found that improved results in boring accuracy can be obtained by providing adjustment means located exteriorly of the reaming tool and the boring bar, with the result that the adjustment of the distance between the axis of rotation of the boring bar and the individual cutting edges can be easily accomplished to effectuate equidistant spacing of these bits about the axis of rotation.

It accordingly becomes a principal object of the invention to provide a reaming tool that is floatingly suspended about the axis of rotation of a boring bar.

It is a further object of this invention to provide an improved type of reaming tool, characterized by the fact that the cutting edges thereof can be adjusted axially of the tool so as to vary the spacing thereof from the axis of rotation of the boring bar, with such adjustment being accomplished exteriorly of the reaming tool, without removal thereof from the boring bar.

It is a still further object of this invention to provide a double-ended reaming tool, characterized by the fact that the opposed ends thereof automatically adjust equidistant from the axis of rotation of the boring bar and further characterized by the fact that the axial location of the respective cutting bits can be adjusted independently of each other.

It is a still further object of this invention to provide an improved type of reaming tool that is adaptable to use in conventional type boring bars and which is characterized by simple and highly efficient operation while being relatively low-cost in production and cost.

These and other objects of the invention will become more apparent upon a reading of the following brief specification considered and interpreted in the light of the accompanying drawings.

Figure 2:
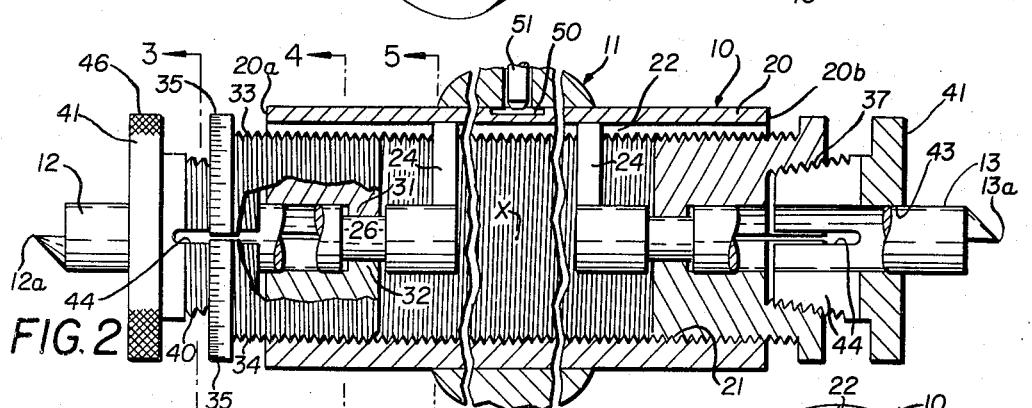
Figure 2 is a sectional view through the improved reamer per se.
Figures 3, 4, 5:
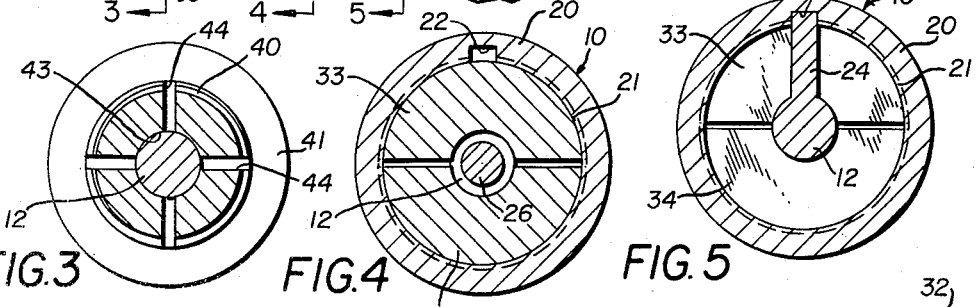

Figures 3, 4 and 5 are sectional views taken on the lines 3—3, 4—4, and 5—5 of Figure 2.

Figures 6, 7, 8:
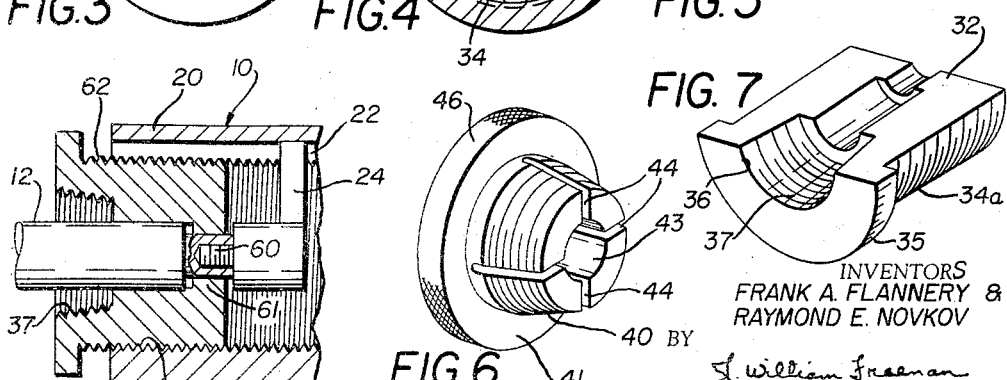

Figures 6 and 7 are perspective views of component parts of the reaming tool.

Figure 8 is a partial section of a modified form of cutting bit.

Figure 1:
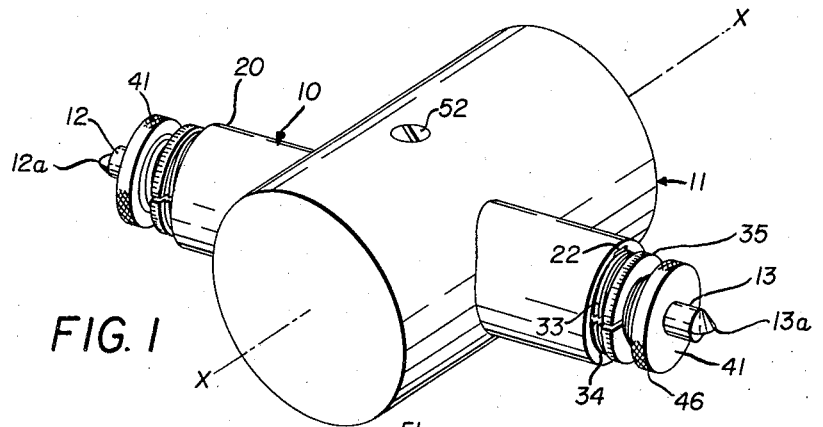
Figure 1 is a perspective view showing the improved reamer positioned within a boring bar.

Referring now to the drawings, and in particular to Figure 1 thereof, the improved reamer, generally indicated by the numeral 10, is shown floatingly suspended transversely of a boring bar 11 so as to have cutting bits 12 and 13 thereof effectuate boring upon a hole upon subsequent positioning and rotation of the boring bar 11 about its axis of rotation X—X in a manner well known in the prior art.

The reamer 10 per se, as best shown in Figure 2, includes an elongate tubular cylinder 20, internally threaded as at 21, and further including a slot, or key-way 22 that extends axially thereof between ends 20a and 20b; the arrangement being such that bit 12, as well as the adaptor therefor, is carried adjacent end 20a, while bit 13, as well as the adaptor therefor, is carried adjacent to end 20b. Because the adaptors that receive and position the bits 12 and 13 with respect to the member 20 are identical in structure, a detailed description of one adaptor will be set forth with it being understood that the remaining adaptor is similarly constructed.

Accordingly, each bit 12 and 13 includes at one axial end thereof a key 24 that is designed to be received in key-way 22 so that relative rotation is prevented between the cylinder 20 and the individual bits 12 and 13, while relative axial movement between these component parts can be accomplished by other components, as will presently be described.

To this end, each bit 12 and 13 includes a reduced neck portion 26 within which is received radial flanges 31 and 32 that are provided upon half rings 33 and 34 respectively. A typical half-ring is shown in perspective in Figure 7 of the drawings, and accordingly includes an externally threaded surface 34a that terminates in a shoulder 35, the exterior surface of which may be conveniently knurled for the purposes of facilitating turning of the adaptors during adjustment of the axial position of the cutting bit 12 as will presently be described. Also, one external surface of the flange 35 may be calibrated to indicate the extent of axial movement.

Additionally, each half-ring 33 and 34 further includes a hemispherical opening 36 that is provided in the flange 35 so as to define one axial end of a tapered thread that is indicated by the numeral 37, with this tapered thread 37 extending inwardly from the opening in flange 35 as best shown in Figure 2 of the drawing.

Receivable within the just-described tapered thread 37 are the exterior threads 40 of a tapered bushing indicated generally by the numeral 41 and shown best in Figure 6 of the drawing. This bushing 41 as also shown at the right-hand side of Figure 2, is of unitary construction and is arranged to encircle and surround each bit 12 and 13 while having its exterior surface threadingly engageable with the threads 37 as a result of the previously described external threads 40 which are arranged to engage with the tapered thread 37. A central aperture 43 is provided for reception of the bushing 41 around the bits 12 and 13, and similarly, axially extending slots 44, 44 are provided for the purpose of permitting the reduction of the diameter of the aperture 43 so as to effectuate a tight clamping between the bushings 41 and each bit 12 and 13 as will be presently described. As before, a knurled rib 46 may be provided on one axial end of the bushing 41 for the purposes of effectuating relative rotation thereof, with rotation thereof serving to lock each bit 12 and 13 with respect to the tubular member 20.

In addition to the aforementioned component parts, the exterior surface of the tubular member 20 is provided with a recessed area, generally designated by the numeral 50 and designed for reception of the free end of a screw 51; the arrangement being such that the screw 51 may be backed off, as by turning the head portion 52 thereof, to terminate contact. In the preferred embodiment illustrated, the recess 50 may conveniently be in the form of an elongate slot, although it is manifest that the same may be produced in other ways.

In use or operation of the improved reaming tool, it will first be assumed that the component parts thereof are unassembled. Accordingly, the split rings 33 and 34 will first be positioned in encircling relationship about an individual bit 12, for example, with the flange portions 31 and 32 thereof being positioned in the reduced neck portion 26 of the bit.

At this time, the sub-assembly of the bit 12 and the split rings 33 and 34 may be moved axially towards engagement with the interior of the tubular member 20 with key 24 first being guided into key-way 22 prior to the initiation of threaded contact between the threads 34a and the internal threads 21 of the member 20. In this regard, it is to be noted that when the appropriate location of the bit 12 has been obtained with respect to the rotational center of the tubular member 20, that rotational turning of the flanges 35, 35 can be terminated, with the result that the cutting bit 12 will have its cutting edge 12a positioned at a predetermined distance from the center line.

To lock the cutting bit 12 in this position, it is merely necessary that the bushing 41 have its aperture 43 positioned about the bit 12 and upon axial movement of the bushing 41 along the cutting bit 12 it is believed apparent that the threaded external surface 40 thereof will come in contact with the threaded surface 37 of each split ring 33 and 34. Upon rotating of the bushing 41 relative of the split rings 33 and 34 as by holding one set of flanges 35, 35 while rotating the rib 46, it is believed apparent that the effective diameter at the inner end of the aperture 43 will be decreased as a result of the provision of the slots 44, 44. In this manner, the internal surface of the bushing 41, as defined by the aperture 43, will tightly grip the individual bit 12, for example, which will result in the same being firmly locked with respect to member 20.

At this time, the remaining bit 13 may be positioned with respect to the end 20b by repetition of the above-described process and when the same has been set, the effective cutting width of the reaming tool 10 will have been determined as a result of the spacing between the cutting edges 12a and 13a of the reaming tool 10. At this point, the screw head 52 may be turned so as to back off the screw 51 and at this time the reaming tool 10 may be inserted in the appropriate aperture therefor that has been provided in the boring bar 11 and when the same has been approximately centered, the screw head 52 may be turned in the reverse direction to cause the same to assume the position shown in Figure 1, at which time the same will be loosely fitted within the slot 51.

With the component parts thus assembled, the boring bar 11 may be inserted in the chuck of a machine drive spindle, for example, and upon rotation thereof it is believed apparent that the cutting edges 12 and 13, will be spaced equi-distant along the cutting axis X—X of the boring bar as a result of the ability of the same to float with respect to this axis of rotation.

When a boring operation has been completed and it is desired to reset the remaining tool for any one of several reasons, it is merely necessary that the bushing 41, 41 be backed off axially of tool 10, at which time the split rings 35 can be rotated so as to move axially of the tubular member 20 and thus result in axial relocation of the cutting bits 12 and 13 as a result of the interconnection of the same with these split rings 33 and 34. When the new dimension has been obtained, it is merely necessary that the bushing 41 can be retightened and boring operations resumed as previously described, it being particularly noted that such adjustment or change of dimension of the reaming tool does not necessitate removal of the same from the boring bar.

The modified form of the invention shown in Figure 8 of the drawings is similar in most respects to that previously described in connection with Figures 1 through 7 hereof, and accordingly, except where indicated, like numerals indicate like parts.

The particular improvement of the modified form of the invention relates to the provision of a slightly modified form of cutting bit as well as a modification of split rings that surround the same and serve to axially locate the same with respect to the tubular member 20.

Accordingly, each bit 12 and 13 is of two-piece construction wherein the neck portion 26 thereof is internally tapped so as to permit juncture with a shorter shank portion, indicated by the numeral 60, upon threading engagement between these component parts. By use of a two-piece bit of this character, it is believed apparent that the use of split rings can be eliminated so that a solid ring of similar configuration to the assembled split rings, can be employed, with the flange portion 61 of this ring 62 being received in the reduced neck portion prior to assembly of the shank member 60.

The use or operation of the modified form of the invention operates the same during the actual boring operation, and it is only with regard to the simplified assembly that this modification relates. Accordingly, the unitary ring 62 would be telescoped axially of the bit 12 prior to installation of the shank 60 which also carries the key 24. When the shank 60 has been positioned with respect to the bit 12, for example, as shown in Figure 8, it is merely necessary that the shank 60 be rotated so that the threaded stud thereof is received in the tapped aperture provided in the reduced neck portion 26 and at this time, the component parts are assembled and may be positioned with respect to the tubular member 20 by inserting the key 24 in the key-way 22 of member 20 and then threading the external surface of the ring 62 with respect to the internally threaded surface 21.

In the preceding paragraph, it has been shown how there has been provided a new and novel type of improved reaming tool characterized by the ability of the same to have the opposed cutting edges thereof float with respect to the axis of the boring bar that carries the same.

It has been shown how the adjustment of this reaming tool can be effectuated without necessitating the removal of the same from the boring bar with the result that the amount of "down" time lost in changing reaming tools is considerably minimized.

While a detailed description of the invention has been set forth in accordance with the dictates of the patent statutes it is to be understood that the invention is not so limited. Thus, where specific recitations of material, size, shape or configurations have been set forth, it is to be understood that these are examples only and do not limit the scope of the invention.

It accordingly follows that other modifications of the invention may be resorted to without departing from the spirit hereof or the scope of the appended claims.

What is claimed is:

1. A machine tool of the character described, comprising; a hollow tubular member having opposed axial ends; an elongated cutting bit having a cutting end; means for telescopically positioning said bit concentrically of said tubular member in non-rotatable axially shiftable relationship therewith whereby said cutting end thereof projects from one axial end of said tubular member; said means including a cylindrical adaptor ring unit concentrically positioned between said bit and said member in relatively rotatable axially shiftable relationship therewith; said ring having an axial end thereof projecting beyond said member in encircling relationship to said bit whereby the projecting end of said ring is accessible exteriorly of said member; and a lock ring encircling said bit at an axial location between the projecting ends of said bit and said adapting ring; said locking ring engaging said adaptor ring upon axial movement thereof relatively thereof of said bit exteriorly of said member adjacent one axial end thereof.

2. A machine tool of the character described, comprising; a hollow tubular member having opposed axial ends; a pair of elongated cutting bits, each having a cutting end; means for telescopically positioning said bits adjacent the opposed axial ends of said tubular member in concentric, non-rotatable and axially shiftable relationship therewith whereby said cutting ends project axially of the opposed ends of said member; said means including at least one cylindrical adaptor ring unit concentrically positioned between said bit and said member in relatively rotatable axially shiftable relationship therewith; said ring having an axial end thereof projecting beyond said member in encircling relationship to said bit whereby the projecting end of said ring is accessible exteriorly of said member; and a lock ring encircling said bit at an axial location between the projecting ends of said bit and said adapting ring; said locking ring engaging said adaptor ring upon axial movement thereof relatively thereof of said bit exteriorly of said member adjacent one axial end thereof.

3. A machine tool of the character described, comprising; a hollow tubular member having opposed axial ends; a pair of elongated cutting bits, each having a cutting end; means for telescopically positioning said bits adjacent the opposed axial ends of said tubular member in concentric, non-rotatable and axially shiftable relationship therewith whereby said cutting ends project axially of the opposed ends of said member; said means including at least one cylindrical adaptor ring unit concentrically positioned between said bit and said member in relatively rotatable axially shiftable relationship therewith; said ring having an axial end thereof projecting beyond said member in encircling relationship to said bit whereby the projecting end of said ring is accessible exteriorly of said member; and a lock ring encircling said bit at an axial location between the projecting ends of said bit and said adapting ring; said locking ring engaging said adaptor ring upon axial movement thereof relatively thereof of said bit exteriorly of said member adjacent one axial end thereof; said bits being adjustable relatively of each other.

4. A machine tool of the character described, comprising; a hollow tubular member having opposed axial ends; a pair of elongated cutting bits, each having a cutting end; means for telescopically positioning said bits adjacent the opposed axial ends of said tubular member in concentric, non-rotatable and axially shiftable relationship therewith whereby said cutting ends project axially of the opposed ends of said member; said means including at least one cylindrical adaptor ring unit concentrically positioned between said bit and said member in relatively rotatable axially shiftable relationship therewith; said ring having an axial end thereof projecting beyond said member in encircling relationship to said bit whereby the projecting end of said ring is accessible exteriorly of said member; and a lock ring encircling said bit at an axial location between the projecting ends of said bit and said adapting ring; said locking ring engaging said adaptor ring upon axial movement thereof relatively thereof of said bit exteriorly of said member adjacent one axial end thereof; said tubular member having a recessed area provided on its external surface.

5. A machine tool of the character described, comprising; an elongate tubular member having an internally threaded wall and a keyway extending longitudinally thereof; an elongate cutting bit having a key received in said keyway and being concentrically telescoped within said tubular member; an adaptor ring encircling said bit and being in threaded contact with said internal thread of said member; a locking ring having an internal diameter surrounding said bit and being shiftable axially of said adaptor ring; and means for decreasing the internal diameter of said locking ring upon axial shifting of said locking ring relatively of said adaptor ring.

6. The device of claim 1 further characterized by the fact that said adaptor ring unit is defined by split segments that are positionable together to define a cylindrical unit.

7. The device of claim 5 further characterized by the fact that said adaptor ring unit is split into half circular segments.

8. The device of claim 5 further characterized by the fact that said means include a tapered threaded connection between said locking ring and said adaptor ring.

9. A machine tool of the character described, comprising; a shaft receivable in the spindle of a machine tool and having a transverse cross-bore provided adjacent one axial end thereof; a boring bar unit received in said transverse opening and having axially projecting opposed cutters that project axially beyond said unit; and means for independently adjusting the amount of projection of each said bit beyond said unit from a position exteriorally of said unit and adjacent the bit being adjusted; said unit being received in said transverse opening in a condition of controlled axial shifting whereby the same will float in said opening during rotation of said shaft.

10. A machine tool of the character described, comprising; a shaft receivable in the spindle of a machine tool and having a transverse cross-bore provided adjacent one axial end thereof; a boring bar unit received in said transverse opening and having axially projecting opposed cutters that project axially beyond said unit; and means for independently adjusting the amount of projection of each said bit beyond said unit from a position exteriorally of said unit and adjacent the bit being adjusted.

11. A machine tool of the character described, comprising; a shift receivable in the spindle of a machine tool and having a transverse cross bore provided adjacent one axial end thereof; a pair of opposed cutters received in said transverse cross bore at opposite axial ends thereof and projecting axially beyond said unit; and means for independently adjusting the amount of projection of each said bit beyond said unit from a position exteriorly of said unit and adjacent the bit being adjusted.

References Cited in the file of this patent

UNITED STATES PATENTS

| | | |
|---|---|---|
| 2,125,005 | Jearum | July 26, 1938 |
| 2,623,420 | Harris | Dec. 30, 1952 |
| 2,629,270 | Kaehlert | Feb. 24, 1953 |
| 2,652,634 | De Vlieg | Sept. 22, 1953 |